(12) United States Patent
Saigo et al.

(10) Patent No.: US 7,660,799 B2
(45) Date of Patent: Feb. 9, 2010

(54) REMOTE DESKTOP SYSTEM

(75) Inventors: Kiyokazu Saigo, Kawasaki (JP); Yukio Ogawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 598 days.

(21) Appl. No.: 11/363,969

(22) Filed: Mar. 1, 2006

(65) Prior Publication Data
US 2007/0192491 A1    Aug. 16, 2007

(30) Foreign Application Priority Data
Feb. 16, 2006    (JP)    ............................... 2006-038932

(51) Int. Cl.
*G06F 17/30* (2006.01)
*G06F 26/16* (2006.01)
(52) U.S. Cl. ........................ 707/10; 709/216
(58) Field of Classification Search .................. 707/10, 707/12; 709/203, 219, 224, 225, 226, 229, 709/234, 217; 715/733, 778; 718/106; 702/182, 702/183, 185, 186
See application file for complete search history.

(56) References Cited

U.S. PATENT DOCUMENTS

| | | | | |
|---|---|---|---|---|
| 6,065,043 | A * | 5/2000 | Domenikos et al. | 709/203 |
| 6,349,337 | B1 * | 2/2002 | Parsons et al. | 709/227 |
| 6,657,625 | B1 * | 12/2003 | Chik et al. | 345/467 |
| 6,789,046 | B1 * | 9/2004 | Murstein et al. | 702/182 |
| 6,999,791 | B1 * | 2/2006 | Ishikura et al. | 455/557 |
| 2002/0133330 | A1 * | 9/2002 | Loisey et al. | 703/27 |
| 2004/0088377 | A1 * | 5/2004 | Henriquez | 709/219 |
| 2006/0122955 | A1 * | 6/2006 | Bethlehem et al. | 707/1 |
| 2007/0061399 | A1 * | 3/2007 | Schmieder et al. | 709/204 |

FOREIGN PATENT DOCUMENTS

JP    2005-012775    1/2005

OTHER PUBLICATIONS

Title: Special Edition Using Microsoft® Windows® XP Home Edition Published: Que (Oct. 10, 2001) Author: Robert Cowart.*

* cited by examiner

*Primary Examiner*—Wing F Chan
*Assistant Examiner*—Jonathan Willis
(74) *Attorney, Agent, or Firm*—Antonelli, Terry, Stout & Kraus, LLP.

(57)    ABSTRACT

In a remote desktop system, information pertaining to client resources is included in screen information that a server manages to display in a client. In the remote desktop system, the client collects information pertaining to units making up the client or to programs as resource information, and sends the collected information to the server via a network. The server manages the resource information obtained from the client, and creates screen information to be displayed in the client. In the creation of the screen information, the server creates client screen information (first screen) including the resource information of the server within the screen information of the client, or creates server screen information (second screen) including the resource information of the client within the screen information of the server, and displays the first or second screen in the client.

11 Claims, 9 Drawing Sheets

| OBJECT | POLICY | |
|---|---|---|
| ALL | ACTIVATE IN THE DEVICE WITH LESS RESPONSE DELAY TIME. ACTIVATE IN THE CLIENT DEVICE FOR THE RESOURCE THAT CAN BE ACTIVATED IN BOTH DEVICES | ~5021 |
| | ACTIVATE IN THE SERVER DEVICE FOR THE RESOURCE THAT CAN BE ACTIVATED IN BOTH DEVICES WHEN THE CLIENT DEVICE CPU USAGE > 80% | ~5022 |
| INTERNET EXPLORER | ACTIVATE IN THE SERVER DEVICE WHEN ACCESSING THE "hitachi.co.jp" DOMAIN | |
| OTHER APPLICATION | FROM THE STANDPOINT OF SECURITY, ONLY THE APPLICATION APPLIED TO THE NETWORK ADMINISTRATOR IS AVAILABLE | |

| GROUP | OBJECT | INFORMATION CONTENT |
|---|---|---|
| DEFAULT | KEYBOARD | ALL INPUT INFORMATION IN REMOTE DESKTOP SERVER AREA |
|  | MOUSE |  |
| SETTING A (STATUS) | BATTERY | STATUS CHANGE INFORMATION (STATUS INFORMATION IN CHANGE) |
|  | NETWORK |  |
|  | ANTI-VIRUS MEASURE |  |
| SETTING B (APPLICATION) | INTERNET EXPLORER | ADDRESS INFORMATION |
|  | MESSENGER | INCOMING INFORMATION |

3111 — DEFAULT row
3112 — SETTING A row
3113 — SETTING B row

| GROUP | DEVICE | OBJECT | | INFORMATION CONTENT |
|---|---|---|---|---|
| STATUS | CLIENT | BATTERY | | 90% |
|  | SERVER | NETWORK | | 100Mbps |
|  | CLIENT |  | | 10Mbps |
|  | SERVER | ANTI-VIRUS MEASURE | | 0511/23ver. |
|  | CLIENT |  | | 0511/23ver. |
| APPLICATION | SERVER | INTERNET EXPLORER | C:¥Pro¥IE.exe | — |
|  | CLIENT |  | C:¥IE.exe | http://saigo_.htm |
|  | SERVER | TEXT EDIT | C:¥Pro¥Word.exe | — |

4011 — STATUS row
4012 — APPLICATION row

FIG.5

| OBJECT | POLICY | |
|---|---|---|
| ALL | ACTIVATE IN THE DEVICE WITH LESS RESPONSE DELAY TIME. ACTIVATE IN THE CLIENT DEVICE FOR THE RESOURCE THAT CAN BE ACTIVATED IN BOTH DEVICES | 5021 |
| | ACTIVATE IN THE SERVER DEVICE FOR THE RESOURCE THAT CAN BE ACTIVATED IN BOTH DEVICES WHEN THE CLIENT DEVICE CPU USAGE > 80% | 5022 |
| INTERNET EXPLORER | ACTIVATE IN THE SERVER DEVICE WHEN ACCESSING THE "hitachi.co.jp" DOMAIN | |
| OTHER APPLICATION | FROM THE STANDPOINT OF SECURITY, ONLY THE APPLICATION APPLIED TO THE NETWORK ADMINISTRATOR IS AVAILABLE | |

FIG. 6A

USAGE OF FAT CLIENT PC

FIG. 6B

USAGE OF REMOTE DESKTOP SOLUTION
(NORMAL TIME)

FIG. 6C

USAGE OF REMOTE DESKTOP SOLUTION
(CLIENT SCREEN)

FIG. 6D

USAGE OF REMOTE DESKTOP SOLUTION
(SERVER SCREEN)

REMOTE DESKTOP SYSTEM

BACKGROUND OF THE INVENTION

The present invention relates to a remote desktop system, and particularly relates to a management and display of resources pertaining to a server and a client that make up the remote desktop system.

With the enforcement of Act on the Protection of Personal Information, the social responsibility that companies assume for leakage of information about customers and business partners has become extremely heavy, and the companies place more and more importance on the management of personal information. As a solution for such information management, a remote desktop solution has been drawn attention.

The remote desktop solution is a system where a device on the operating side such as a client and a device on the to-be-operated side such as a server are connected via a communication network, and a user provides control to the server using an input device of the client, such as a mouse or a keyboard, by referring to the screen information displayed on a display of the client.

The user can access the server from the client via the network and use the information stored in the server, using an application installed in the server. Thus, there is no need to store any required information in the client, and this makes it possible to prevent the leakage of personal information caused by a theft of the client device.

For example, a technology disclosed in Japanese Patent Publication No. 2005-12775 is known as a technology pertaining to the architecture for creating and maintaining the terminal service connection from an external client to an internal intranet client behind a firewall and/or router, in relation to the remote client desktop.

SUMMARY OF THE INVENTION

With the recent popularization of mobile PCs, there are more and more users doing their work outside office or home by driving the mobile PC using a battery without connecting to a power source. However, the information such as the remaining power of the mobile PC's battery used in the remote desktop system only appears in the screen information of the client, so that the user must often check the client screen information while doing work by viewing the server screen information. As for the information showing the client resource, for example, an icon indicating the connection status of the network between the client and the server, the same problem as in the icon indicating the remaining power of the battery occurs.

The use of applications installed in the client makes it possible to improve the efficiency of the work. For example, in the case where Internet Explorer is also installed in the client, the activation in the client may lead to reduction in the response delay time, and efficient work may be realized.

As described above, in order for the user using the remote desktop solution to efficiently do work, it is preferable to allow the user to use the application while grasping the resource, in such a manner that the user grasps whether viewing the client screen information or the server screen information and switches the screen in accordance with the necessity.

It is therefore an object of the present invention to reasonably include the information pertaining to the client resources in the screen information the server manages, and manage the screen information in a remote desktop system.

The remote desktop system according to the present invention is preferably configured as follows.

That is, in a remote desktop system where a client and a server are connected via a network, the client has: a display device for displaying screen information; a resource information collection means for collecting information pertaining to units making up the client or to programs as resource information; and a communication means for sending the resource information collected by the resource information collection means to the server via the network, and the server has: a resource information management means for managing resource information including the server resource information and the resource information sent and obtained from the client; and a screen information creation means for creating screen information to be displayed on the display device of the client, wherein, based on the resource information generation means, the screen information creation means creates client screen information (first screen information) including the server resource information within the screen information of the client, or creates server screen information (second screen information) including the resource information of the client within the screen information of the server, thereby to display the first or second screen information that is created by the screen creation means and is received via the communication means, in the display device of the client.

A preferred embodiment is that the resource information collection means collects, as the resource information, at least one of the following pieces of information: input information that is input from an input device that the client has, information about a battery to supply power to related units within the client, information about auxiliary equipment such as a network interface card, and information pertaining to applications installed in a memory of the client.

Further, it is preferred that the resource information management means has a section for determining whether the client and the server hold the same resource information, and when it is proved that the same information exists as a result of the determination by the determination section, the screen creating means does not update the screen pertaining to the same resource information.

Further, there may be a case where the same application is included in the same resource information, and when the use of the resource due to the application activation is requested in the client, it is preferred that the resource management means uses the resource of the device in which the optimum operation is expected, and when the device in which the optimum operation is expected is changed, the system automatically changes the device to use the resource.

Further, it is preferred that when the determination section of the resource information management means does not determine that the server and the client hold the same resource, the screen information creation means adds the resource and updates the screen information.

Further, it is preferred that the screen information creation means changes the screen information by sorting the client resource information and server resource information that the server manages by the client and the server respectively, in response to a request from the client.

Further, an embodiment is that the client has a writing control means of permitting the reading and execution of data in the client while prohibiting the writing of data in the client, except for an access from a specific device.

A preferred configuration embodiment of the remote desktop system according to the present invention is that, in a remote desktop system where a client and a server are connected via a network, the client has: a display device for displaying screen information; a resource information collection means for collecting the information pertaining to units making up the client or to programs including applications as resource information; and a communication means for sending the resource information collected by the resource information collection means to the server via the network, and the server has: a resource information management means for managing resource information including the server resource information and the resource information sent and obtained from the client, having a determination section for determining whether the server and the client hold the same resource information; and a screen information creation means for creating screen information to be displayed on the display device of the client, wherein the screen information creation means, based on the resource information management means, creates client screen information (first screen information) including the resource information of the server within the screen information of the client, or creates server screen information (second screen information) including the resource information of the client within the screen information of the server, thereby to display the first or second screen information that is created by the screen creation means in the display device of the client, and when it is proved that the same application exists in the server and the client as a result of the determination by the determination section, the screen information creation means carries out a process of including the display pertaining to the resource information of either of the devices, in the first or second screen.

Further, an embodiment is that the screen information creation means includes an icon or a shortcut indicating the resource information as display pertaining to the resource information, in the screen information.

Further, an embodiment is that, when battery information that the client has is included in the resource information, the screen information creation means includes an icon or a shortcut indicating the battery, in the second screen information.

Further, it is preferred that the client has a target resource definition DB for storing the resource information to be managed, and the server has a resource management DB for storing the resource information in the server and the client that the server manages, wherein the resource information collection means refers to the target resource definition DB, collects the resource information defined in the DB, and sends the information to the server, and then the server adds and stores the resource information in the resource DB, when the received resource information is new.

Further, it is preferred that the server has a policy management DB for storing handling policy pertaining to the resource information and controls either of the devices, the server or the client, in accordance with a definition of the policy registered in the policy management DB.

The control method of screen information according to the present invention is preferably a control method of screen information in a remote desktop system where a client and a server are connected via a network, the control method including in the client the steps of: collecting information pertaining to units making up the client or to programs as the resource information; and sending the collected resource information to the server via the network, and including in the server the steps of: managing resource information including the server resource information and the resource information sent and obtained from the client; creating client screen information (first screen information) including the server resource information within the screen information of the client, or creating server screen information (second screen information) including the resource information of the client within the screen information of the server; and sending the created first or second screen information to the client and display it in a display device.

An embodiment is that in the remote desktop system where the client has a target resource definition DB for storing the resource information to be managed, and the server has a resource management DB for storing the resource information in the server and the client that the server manages, the client refers to the target resource definition DB, collects the resource information defined by the DB, and sends the resource information to the server, and then the server adds and stores the resource information in the resource management DB, when the received resource information is new.

Further, an embodiment is that the step of managing resource information has a step of determining whether the server and the client hold the same resource information, and when the same resource information exists in the both devices as a result of the determination, the step includes only the display pertaining to the resource information of either device, in the screen information.

The present invention is also understood as a program to carry out the above-described means or steps on the client or the server.

DESCRIPTION OF THE PREFERRED EMBODIMENT

Hereinafter, the preferred embodiments of the present invention will be described in detail using the accompanying drawings.

In the following embodiments, the term "resource" is referred to as the component units in the server and client devices, such as a storage device like a memory or a hard disk, an input device like a keyboard or a mouse, and an output device like a display or a printer, as well as the programs used in these devices, the data associated with these programs, and the input data.

Figure 1:
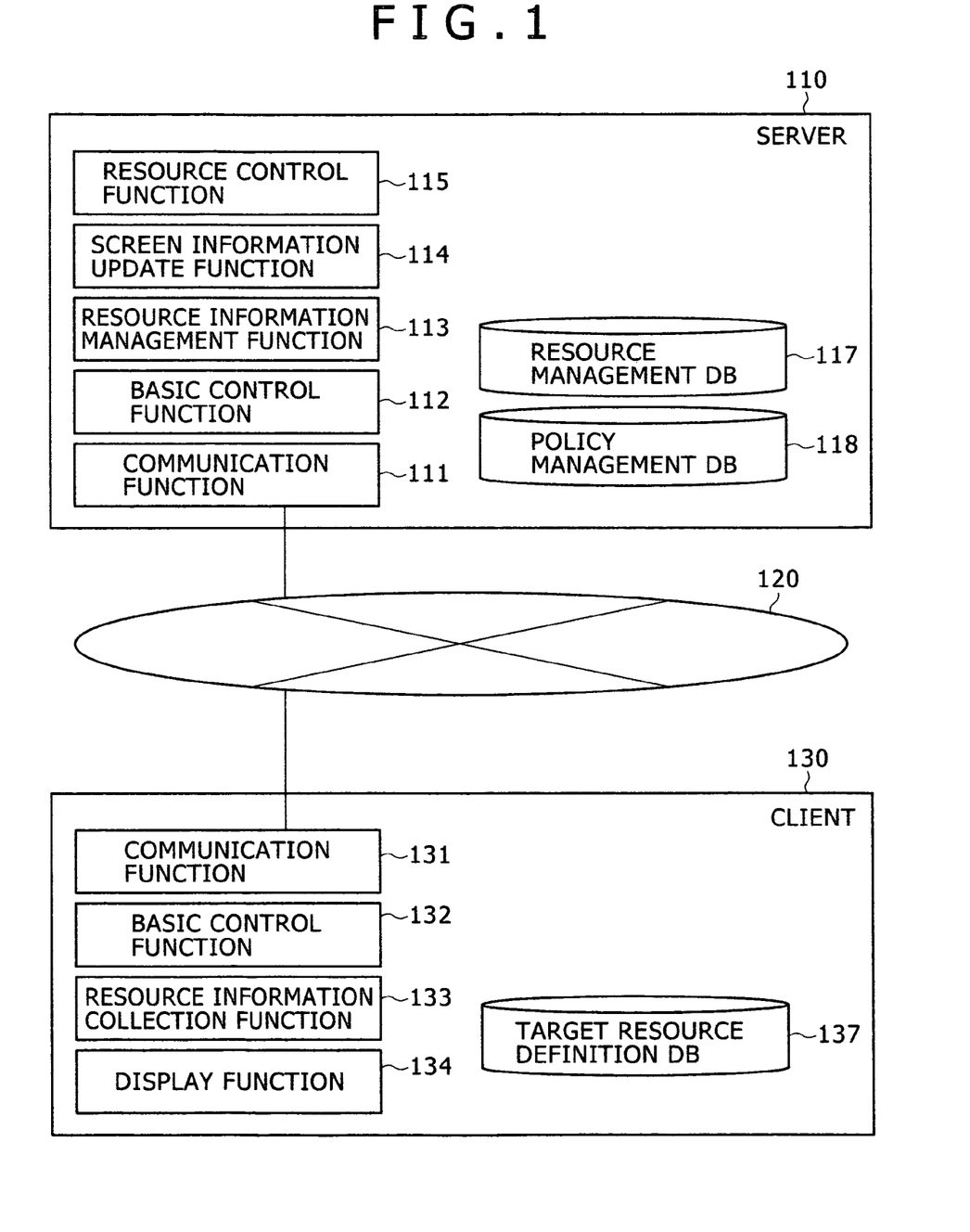
FIG. 1 is a view showing a configuration embodiment of a remote desktop system.

FIG. 1 shows a configuration embodiment of a remote desktop system according to an embodiment.

This system is made up of the client 130 and a server 110, which are connected via a network 120. Incidentally, plural clients 130 may be actually connected to servers via the network. In such a case, the clients are assumed to be connected corresponding to the servers such as blade servers, respectively.

The client 130 has a communication function 131, a basic control function 132, a resource information collection function 133, a display function 134, and a target resource database (hereinafter, simply referred to as a DB) 137. These functions are realized by the execution of the software such as the application programs and system programs.

The communication function 131 carries out communication between the client 130 and the server 110, and sends to the server 110 all the information including the information pertaining to the application, such as the information pertaining to the input of the keyboard, mouse and the like of the client 130 and to the applications that can be activated, and the information pertaining to the running applications, as well as including the information pertaining to the status of the client 130, such as the battery status or the network status (hereinafter, the information pertaining to all of these resources is referred to as the source information).

The basic control function 132 is a central function of the client 130 to provide an integrated control over each of the sections. When receiving an application activation command from the server 110 through the communication function 131 of the client 130, the basic control function 132 activates the application, and when receiving the information of the desktop image, sends a command to the display function 134.

The resource information collection function 133 collects the resource information to be sent to the server. In other words, the resource information collection function 133 collects the information pertaining to the application such as the information pertaining to the input of the keyboard, mouse and the like of the client 130 and to the applications that can be activated, and the running applications, as well as the information pertaining to the status of the client 130, such as the battery status or the network status.

The display function 134 is controlled by the basic control function 132 to display the desktop image in the display and presents it to the user.

Figure 3:
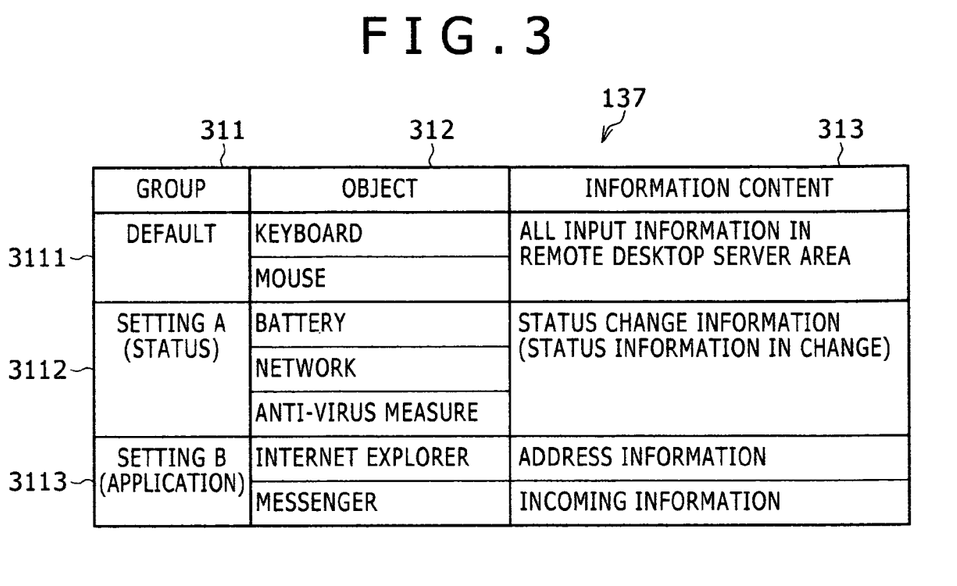
FIG. 3 is a view showing the overview of a target resource definition DB 137 of the client.

Incidentally, the configuration of the target resource definition DB 137 will be described below with reference to FIG. 3.

Next, the configuration of the server 110 will be described.

The server 110 has a communication function 111, a basic control function 112, a resource information management function 113, a screen information update function 114, a resource control function 115, a resource management DB 117 and a policy management DB 118. These functions are realized by the execution of the software such as the application programs and system programs.

The communication function 111 carries out communication between the server and the client 130, receives the resource information of the client, and sends the screen information of the server 110 to the client.

The basic control function 112 is a central function of the server to provide an integrated control over each of the sections.

The resource information management function 113 interprets the received resource information of the client 130, and determines the resource information to be displayed as the screen information. For example, when the battery information of the client 130 is included as the resource information of the client 130, the resource information management function 113 adds the battery information to the screen information of the server 110.

Herein, when the same resource as in the client 130 exists in the server 110, the resource information management function 113 does not add and display the resource to the screen information. For example, in the case where Internet Explorer (hereinafter referred to as IE) is installed in both the client 130 and the server 110 and when an icon to activate IE is displayed in the original screen information of the server 110, the resource information management function 113 does not add to change the screen information of the server 110, even if the information that IE is installed is included in the resource information of the client 130.

The screen information update function 114 is a function for creating screen information, which changes the screen information of the server 110, updates the screen information, or creates new screen information, in response to a command of the resource information management function 113. The created screen information is passed to the communication function 111.

The resource control function 115, when the user asks for the use of the resource that the server and the client commonly hold, uses the resource of the device where the optimum operation is expected, and automatically changes the device to use the resource in accordance with the necessity. At this time, it inherits the parameters such as the input values for the use of the other device resource. For example, when the user clicks the icon displayed in the screen information of the server 110 in order to use IE, IE of the client 130 is activated because the response delay time is expected to be short. Subsequently, when the user asks for the access to a site allowing the access only from the server 110 due to the access restriction, the address of this site is sent to the server 110, and IE is activated in the server 110, and then the site is displayed on the display.

Figure 4:
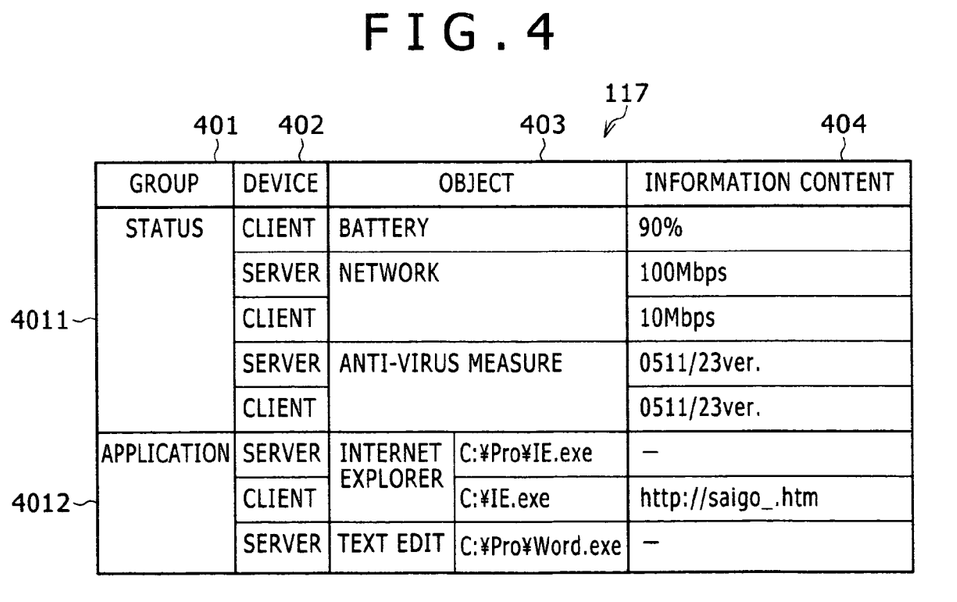
FIG. 4 is a view showing the overview of a resource management DB 117 of a server.
Figure 5:
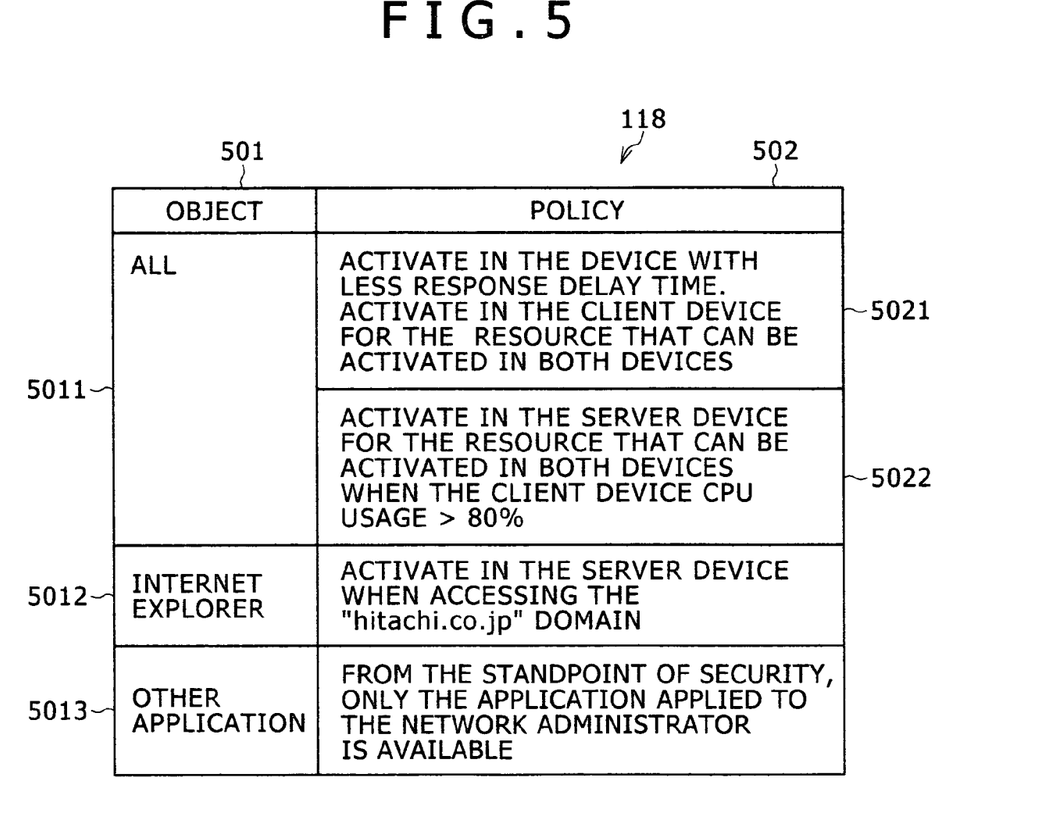
FIG. 5 is a view showing the overview of a policy management DB 118 of the server.

Incidentally, the configurations of the resource management DB 117 and the policy management DB 118 will be described below with reference to FIGS. 4 and 5.

Next, the hardware configurations of the devices, the server 110 and the client 130, will be described with reference to FIG. 2.

The client 130 has units such as a CPU (Central Processing Unit) 201, a memory 202, a storage device 203, an input device 204, an output device 205, a communication interface 206, and a battery 207.

The memory 202 stores the programs and the data to be processed. The CPU 201 executes the programs loaded in the memory 202.

The storage device 203 is, for example, a medium such as a HDD (Hard Disk Drive), a CD (Compact Disc), or a DVD (Digital Versatile Disk), and a drive device thereof.

The input device 204 is, for example, a keyboard, a mouse, a scanner and the like. The output device 205 is, for example, a display, a speaker and the like. In this embodiment, the output device 205 is for presenting about the management of the screen that is displayed on the display. The communication interface 206 is for connecting with the communication network 121.

Figure 2:
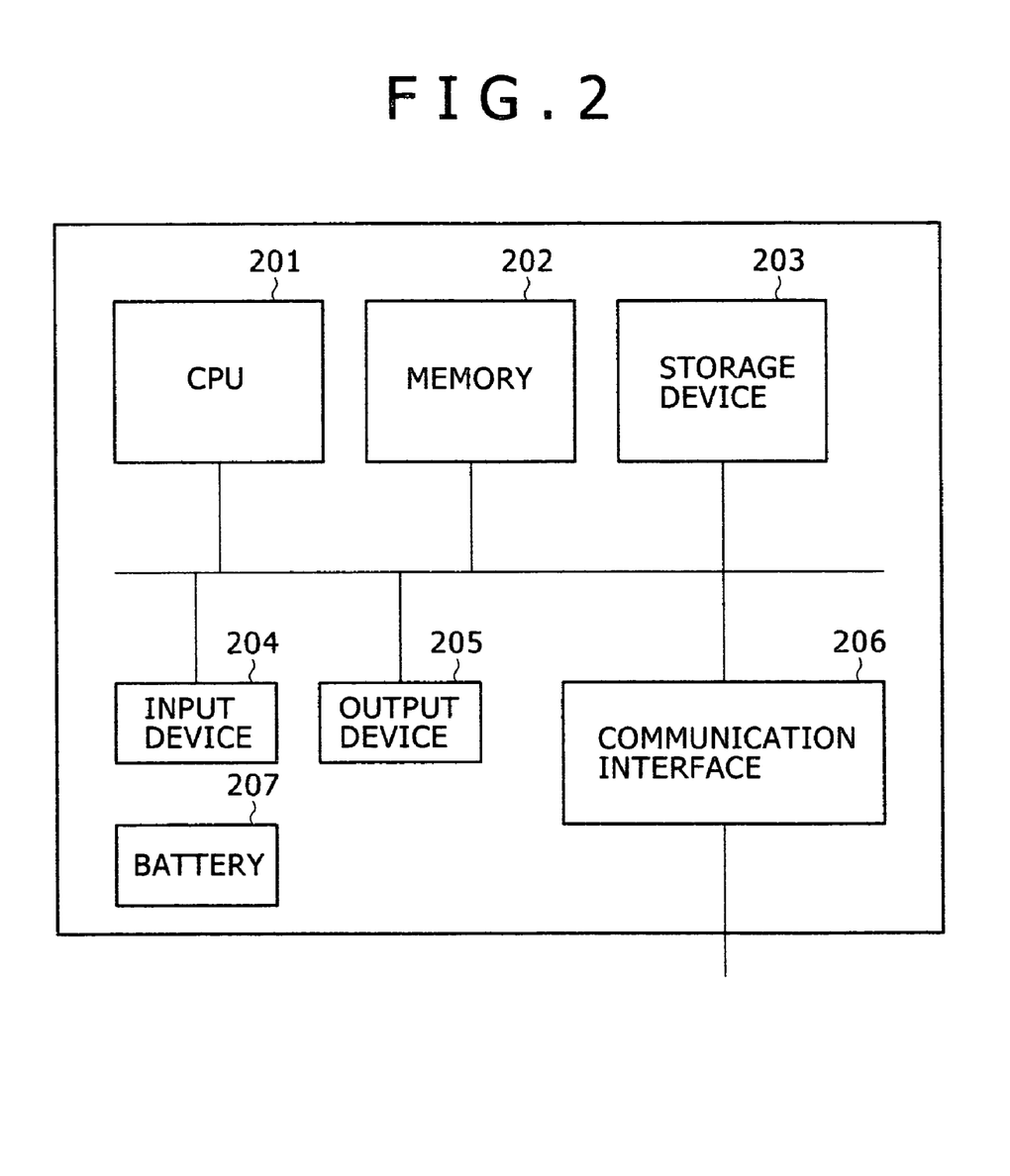
FIG. 2 is a view showing a hardware configuration embodiment of a client 130.

Incidentally, the hardware configuration of the server 110 is substantially the same as the configuration shown in FIG. 2. However, the output device 205 and the battery 207 are not necessarily required, and may be provided in accordance with the necessity.

Next, the configuration of the target resource definition DB 137 of the client 130 will be described with reference to FIG. 3.

The target resource definition DB 137 is a DB for defining the resource information that the client 130 has. The resource information is sent from the client 130 to the server 110, and is managed in the server. The resource information is grouped into three categories: Default 3111, Setting A 3112 pertaining to the status information, and Setting B 3113 pertaining to the application, which are defined by Group 311, Object 312, and Information Content 313 respectively.

Default 3111 is the information pertaining to the hardware such as the input device that the client originally has, which is sent from the client 130 to the server 110 in the use of the remote desktop solution. Information Content 131 is for all the input information in the area the server manages, for example, the information input from the input device (Object 312) such as the mouse or keyboard of the client 130. The resource information collection function 133 detects these pieces of input information 313, and sends the information to the server 110.

Setting A 3112 is the status information of the client 130 that the user desires to display in the screen information of the server 110. In Content 313, for example, the information pertaining to the battery status of the client 130, the network status, the status of the anti-virus software and the like is included. The resource information collection function 133 detects changes in these pieces of status information, and sends the changed status information to the server 110.

Setting B 3113 is the information pertaining to the applications that the user desires to display in the screen information of the server 110 and that are installed in the client 130. For example, the information about Internet Explorer, Messenger and the like that are installed in the client 130. The resource information collection function 133 detects these pieces of information pertaining to the applications, and sends the information to the server 110. For example, in the case of Internet Explorer, the resource information collection function 133 sends to the server 110 the address that is input in the address entry field.

The user registers, for example, the information as described above in the target resource definition database 137 when placing the client 130. The information is sent from the client 130 to the server 110. The resource information management function 113 of the server 110 controls to add and register an icon pertaining to the information obtained from the client. The screen information update function 114 creates and updates the screen information for the client 130 so as to include the icon.

Next, the configuration of the resource management DB 117 of the server 110 will be described with reference to FIG. 4.

The resource management DB 117 defines the resource information the server manages. The resource information is grouped into Status Information 4011 and Application 4012, each made up of Group 401, Device 402 indicating the device to be managed, Object 403, and Information Content 404.

Device 402 indicates that the stored information belongs to which device. Object 403 indicates the management items such as the hardware and process functions, and also stores the commands to activate for Application.

Information Content 404 keeps the information pertaining to Object 403. For example, it keeps such information as the battery information pertaining to the remaining amount and the network information pertaining to the speed of circuit. Incidentally, for Application, the Information Content 404 stores the information about whether or not the application is activated and about different parameters. For example, in the case of Internet Explorer, the different parameters are referred to as the information pertaining to the address of the site currently being browsed. In the example of the figure, the server 110 and the client 130 have "Internet Explorer", and the site of "http://saigo_.htm" is being browsed. Incidentally, the hyphen "-" indicates suspension.

Next, the configuration of the policy management DB 118 of the server 110 will be described with reference to FIG. 5.

The policy management DB 118 defines the policy pertaining to the resource information to be handled. This DB 118 stores Object 501 to be controlled and the contents of Policy 502. For example, the following policies are set.

Control policy for all resources 5011 is set to activate in the device with the minimum response delay time. For the applications capable of being activated in the both devices, it is set to activate in the client (5021). However, when the CPU resource of the client exceeds 80%, the server is prioritized (5022).

In the case of activating Internet Explorer and accessing, for example, the "hitachi.co.jp" domain, the policy is set to activate in the server (5012).

In the control of the resources, the server refers to the policy registered in the policy management database 118 to carry out control. As for Other Application 5013, only the application that is applied to the network administrator is available.

Next, the screen contents displayed on the display of the client 130 will be described with reference to FIGS. 6A to 6D.

Figure 6A:
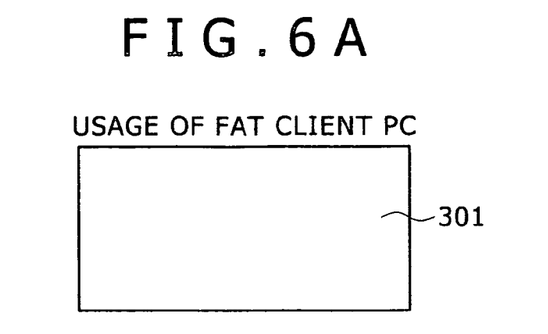
FIGS. 6A to 6D are views showing embodiments of the screen information displayed on a display of the client.

In the case of using a conventional fat client PC (not using the remote desktop solution), screen information 301 of the client 130 is displayed as shown in FIG. 6A. In other words, the information about all of the OS and applications is stored in the storage device of the client 130, and the operation information about the mouse, keyboard and the like is processed inside the client 130.

Figure 6B:
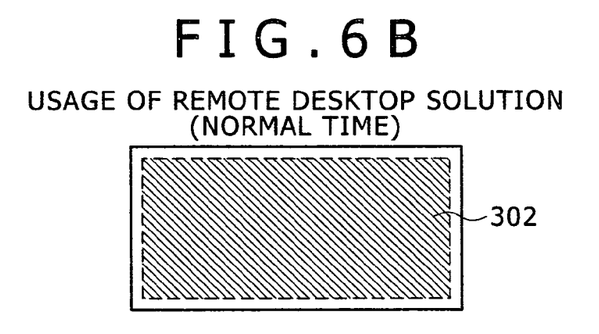

On the other hand, in the case of using the remote desktop solution, as shown in FIG. 6B, screen information 302 of the server 110 is displayed in the normal time. Herein, the input information by the mouse and keyboard of the user who operates the client 130 is transmitted to the server 110 by the communication function 131 of the client 130, and processed in the server 110. The client 130 receives the desktop screen information which is the process result in the server 110 as the response, and displays it in the display.

Figure 6C:
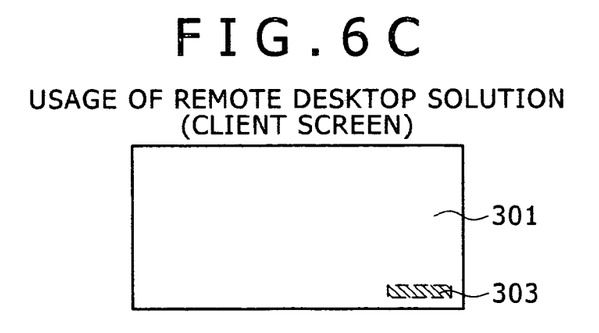

Under the condition of using the remote desktop solution, the screen information 301 of the client 130 is displayed. In this case, as shown in FIG. 6C, an icon 303 of the reduced screen information of the server 110 (that the server screen information 301 shown in FIG. 6B is reduced) is displayed within the client screen information 301.

Figure 6D:
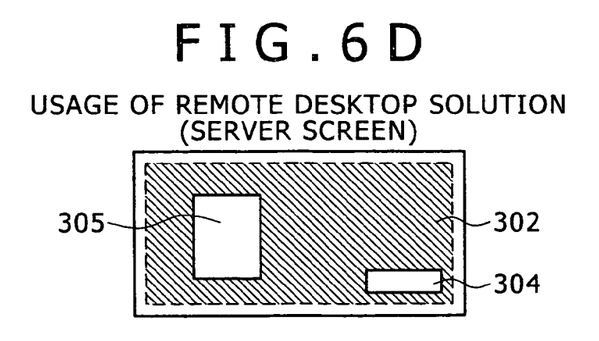

In this embodiment, particularly as shown in FIG. 6D, in relation to the resource information of the client 130 that is sent to the server 110, the server synthesizes the resource information 304 and resource information 305 of the client 130 in the screen information 302 of the server 110 by the screen information update function 114 of the server. Herein, the resource information 304 is the resource information of the client 130 through the server 110, and the resource information 305 is the resource information of the client 130 not through the server 110. The phrase "through the server", for example, is referred to as the case of accessing a certain Web site through the server using Internet Explorer, while the phrase "not through the server" is referred to as the case of directly accessing a Web site from the client. In either case, the icon of the resource information pertaining to the application is displayed in the screen information of the client 130.

Figure 7:
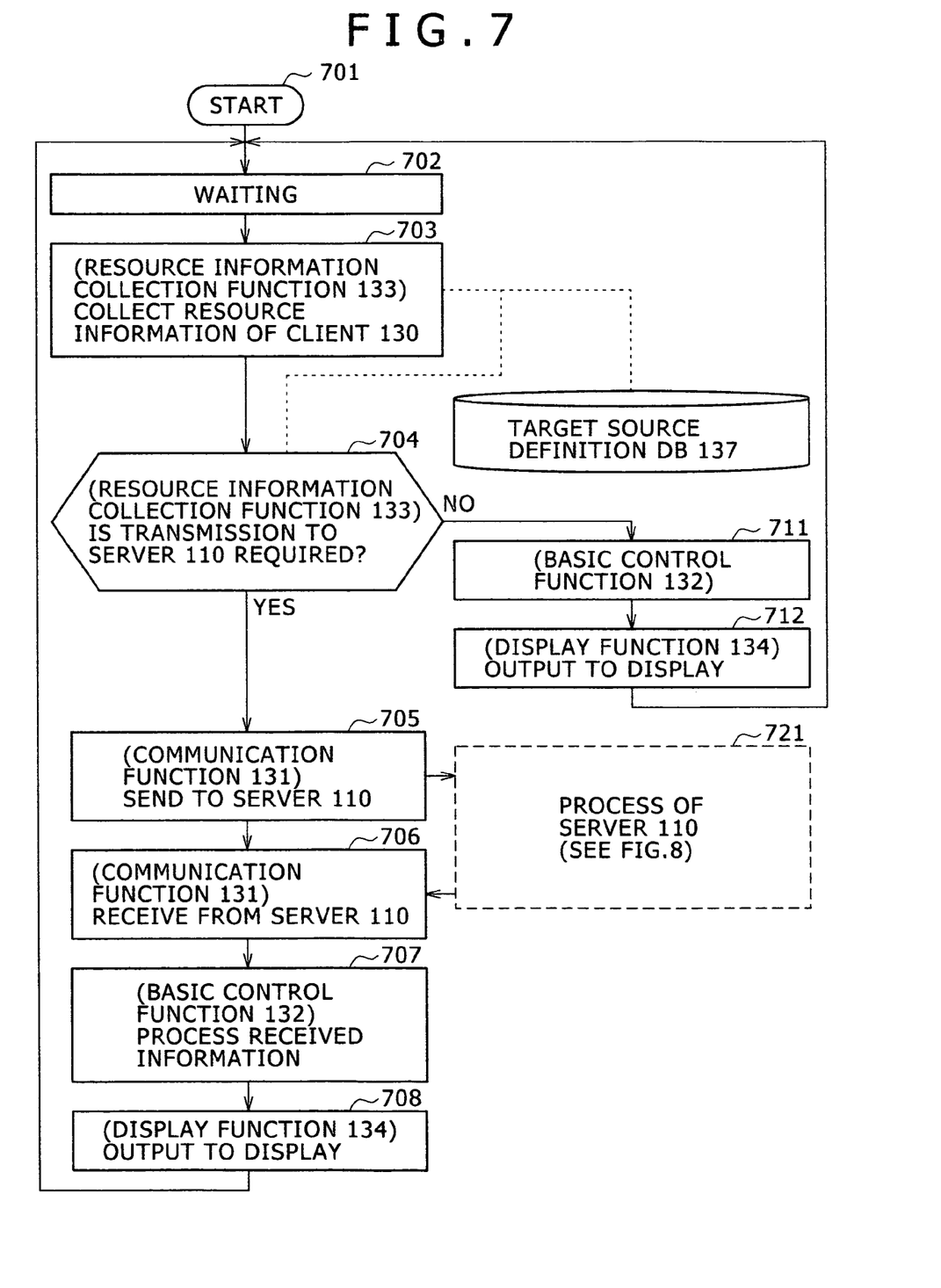
FIG. 7 is a view showing the process flow in the client.

Next, the process operations in the client 130 and the server 110 will be described with reference to FIGS. 7 to 8. First, the process in the client 130 will be described with reference to FIG. 7.

The client 130 is activated (701) and remains in waiting status until collecting the defined resource information within the client 130 (702).

The client 130 collects target resource information in accordance with the information defined in the target resource definition DB 137 by the resource information collection function 133 (703). Herein, the timing of the collection may be periodical or may be triggered by the event of the status change.

Then, the client 130 determines whether or not to send the information to the server 110 in accordance with the information of the target resource definition DB 137 by the resource information collection function 133 (704). When required to send the information, the resource information collection function 133 passes the information to be sent to the communication function 131, and the communication function 131 sends the information to the server 110 (705). Incidentally, the process in the server 110 (721) will be described below with reference to FIG. 8.

In the above-described Step 704, when it is not required to send the information to the server 110, the client controls the information in the basic control function 132 (711), and displays the result in the display device based on the control of the display function 134 (712).

In the communication with the server 110, the communication function 131 receives the updated screen information from the server 110 (706). The application activation command may be included in the received information. Then, under the control of the basic control function 132, the process of the information received from the server 110 is carried out (707). The screen information is passed to the display function 134. When the application activation command is included, the application is activated in response to the command. Then, the screen information is displayed on the display by the control of the display function 134, and is presented to the user.

Next, the process operation in the server 110 will be described with reference to FIG. 8.

The server 110 is activated and remains in waiting status until receiving the information sent from the client 130 (801).

When the server receives the resource information sent from the client 130 (802) by the communication function 111, the analysis process of the received information is carried out by the basic control function 112, and the resource information is sent to the resource information management function 113 (803).

By the process of the resource information management function 113, the server checks the resource information against the information stored in the resource management DB 117 of the server 110 to determine the resource information to be added to the screen information of the server 110 (804). Then, the resource control function 115 determines the add method of the resource to be added (805). In other words, the resource control function 115 refers to the policy management DB 118 and, for example in the case of the battery information of the client 130, adds an icon indicating the battery information. In the case of the application, it determines the device, either the client or the server, to activate the application.

The screen information update function 114 updates the screen information of the server 110 in accordance with the control result of the resource control function 115 (806). Then, the basic control function 112 creates the updated screen information as the transmission information (807), and the screen information is sent to the client 130 by the communication function 111 (808).

Next, taking the display of the battery information of the client 130 as an example of the status information of the client 130, the process operation will be described with reference to FIG. 9. Incidentally, FIG. 9 is the appropriate abstract of the flows of FIGS. 7 and 8.

First, the resource information collection function 133 adds the battery information to the target resource definition DB 137 (703). Then, the client 130 sends the battery status information and the information that the battery information has been added to the target resource definition DB 137, to the server 110 (705).

The server 110 receives the resource information sent from the client (802). Then, under the control of the resource information management function 113, the server refers to the resource management DB 117 and confirms whether the information pertaining to the battery exists in the server 110 (804). As a result of the confirmation, when determining that the battery information does not exist in the server 110, the resource information management function 113 stores the received battery information in the resource management DB 117, and determines to add an icon indicating the battery status in the screen information of the server 110.

Then, based on the determination of the resource information management function 113, the screen information update function 114 changes the screen information of the server 110 so as to add the icon of the battery (806). The communication function 111 sends the changed screen information to the client 130 (808).

The communication function 131 of the client 130 receives the screen information sent from the server 110 (706), and the client displays the received screen information in the display under the control of the display function 134 (708).

Subsequently, the battery information will be sent to the server 110 in the change of the battery status, and the screen information of the server 110 will be changed. When the user asks for the detailed information about the battery status, the server updates the server screen information based on the information stored in the resource management DB 117, and sends the updated information to the client 130 to display in the display.

Figure 10:
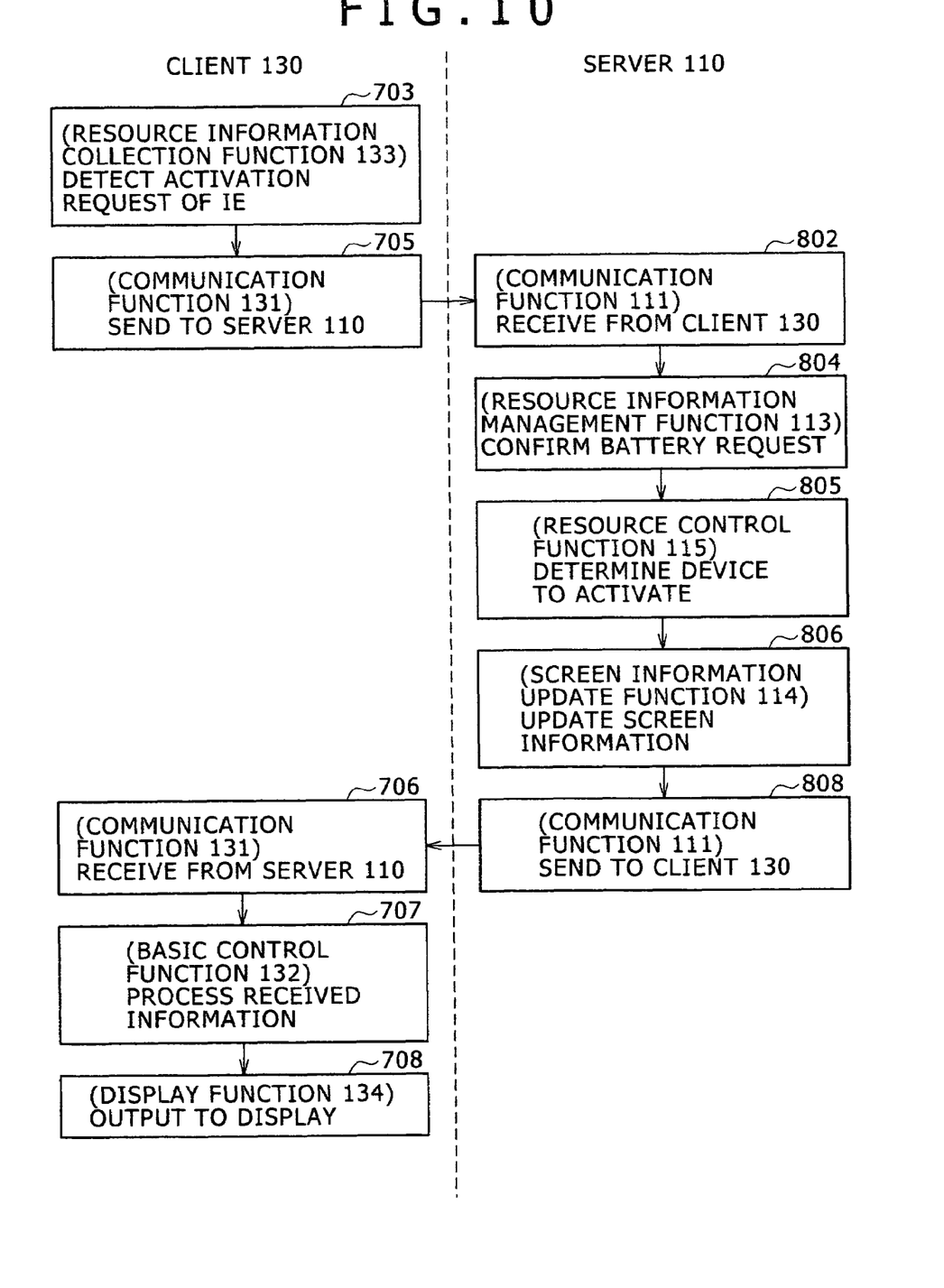
FIG. 10 is a view showing the process flow in the case of using the application installed in both of the client and the server.

Next, as an example of the application information of the client 130, the display example of Internet Explorer (hereinafter referred to as IE) that is installed in the client 130 will be described using FIG. 10. Incidentally, FIG. 10 is the appropriate abstract of FIGS. 7 and 8.

The process operations from adding the information about IE of the client 130 to storing in the resource management DB 117 of the server are the same as the operations in the case of the battery information shown in FIG. 9, except for the operation of the resource information management function 113 of Step 804.

In this example, in the process of the resource information management function 113 of Step 804, the sever 110 refers to the resource management DB 117 to confirm that IE is installed in the server 110, stores the received information about IE in the resource management DB 117, and determines not to carry out the update of the screen information, such as addition of an icon. Incidentally, the registration operations of the IE information to the DB 117 are previously defined as the major applications. The major applications may be automatically carried out, or the user may manually operate them.

Hereinafter, the process operations will be briefly described.

First, the resource information collection function 133 detects the IE activation request of the user (703). The communication function 131 sends the information that the IE activation request has been detected, to the server 110 (705).

In the server 110, the communication function 111 receives the IE activation request information (802). Then, the resource information management function 113 refers to the resource management DB 117 to determine the activation of IE, and passes the process to the resource control function 115 (804). The resource control function 115 determines, according to the definition of the policy management database 118, the device, either of the server 110 or the client 130, where IE is to be activated (805).

When determining to activate IE in the server 110, the server activates IE, changes the screen information (806), and sends the screen information to the client 130 (808). The subsequent processes are the same as the above-described operations.

On the other hand, when the resource control function 115 determines to activate IE in the client 130, the operations are as follows.

In the screen information update function 114 of Step 806, the server changes the application list in the taskbar area and adds IE to the list. The communication function 111 sends the screen information changed (namely, including the IE taskbar) and the IE activation command to the client 130.

In the client 130, the communication function 131 receives the screen information and the command (706), and the client activates IE in response to the command under the control of the basic control function 132 (707). Further, the display function 134 displays the received screen information, namely, the screen information including the IE taskbar in the display.

Subsequently, in relation to the operation involving IE, the address information of the site to be browsed is detected by the resource information collection function 133, and the address information is sent to the server 110. Then, the same operations are repeated.

Incidentally, in the case where a change in the device to activate IE arises during the operation, any of the processes of stopping, hiding, and doing nothing, can be carried out relative to IE that has been running, in accordance with the policy management DB 118.

In the case where the reduction operation is carried out, a way to return to the original is to select IE that is added to the taskbar area of the screen information of the server 130. As a way to add a correction to the server screen information, the client resource and the server resource may be separately displayed in accordance with the user's setting.

One embodiment of the present invention has been described, but the present invention is not limited to the above-described embodiment, and is susceptible to various modifications and changes without departing from the scope of the present invention.

Figure 8:
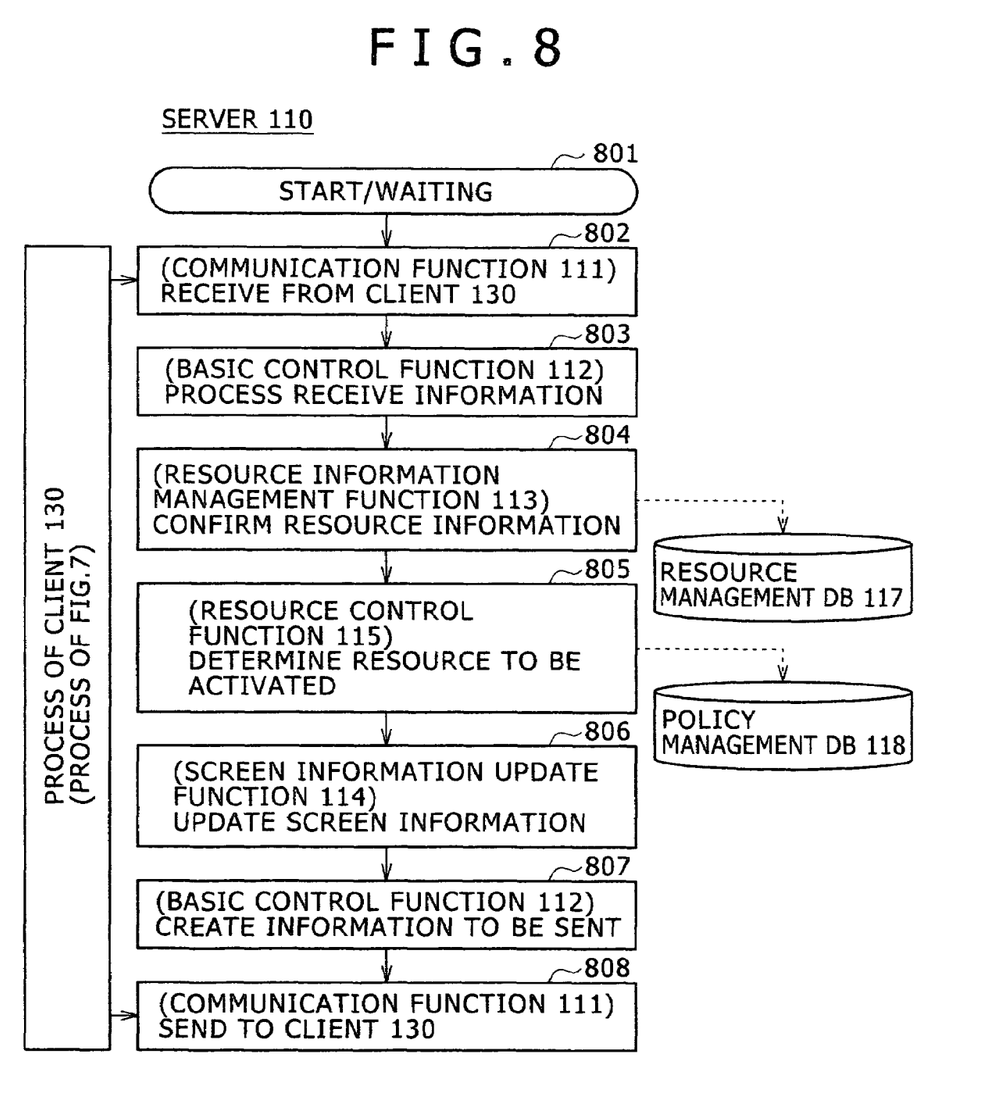
FIG. 8 is a view showing the process flow in the server.
Figure 9:
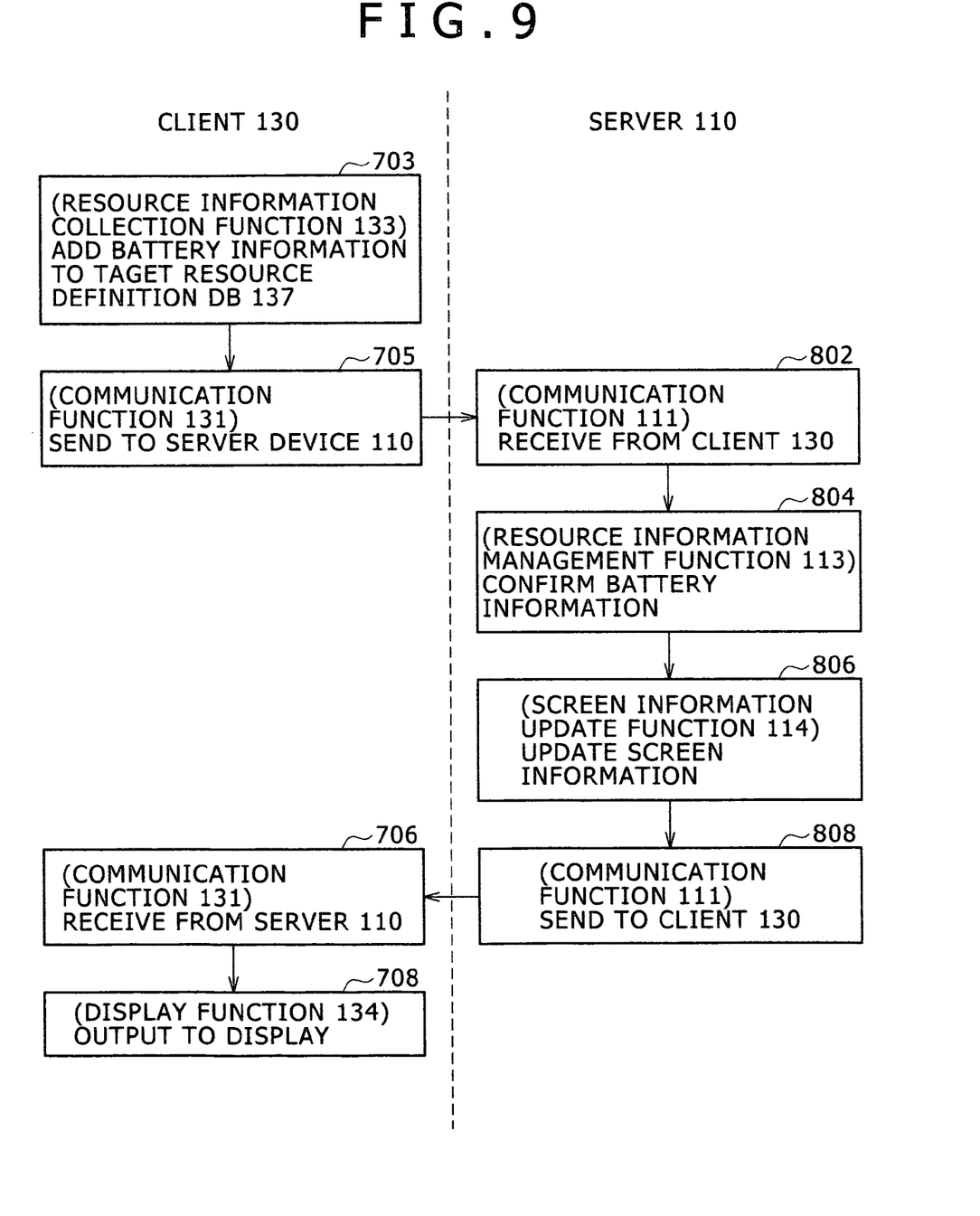
FIG. 9 is a view showing the process flow for displaying the battery information of the client.

For example, in relation to the process operation shown in FIG. 8, it can also be assumed the case where the writing control is imposed on the client 130. The writing control is a function that permits the user only to read and execute the data in the client 130 and prohibits the user from writing in the client 130, except the access from a specific device to the client 130. The specific device is referred to as another sever if there is the other server that the access should be through, in addition to the above-described server 110 relative to the client 130. Incidentally, in this case, it is required to provide a writing prohibition function in the client 130 shown in FIG. 1.

In this case, the operation of Step 805 of FIG. 8 is different from the above-described embodiment. In other words, as for the resource that is just to be browsed and not required to be edited or stored, similarly to the above-described embodiment, the resource control based on the definition of the policy management DB 118 is carried out by the resource control function 115.

On the other hand, as for the resource that is required to be edited or stored, such as Text Edit, the policy is stored in the policy management DB 118 so that the application is basically activated in the server 110, and then the control is carried out in the resource control function 115 based on this policy.

Further, as another variant, when it is apparently the resource of the client, such as the battery information in the above-described embodiment, preferably the resource information is added as it is to the screen information and displayed on the display. However, for the resources both the server and the client hold, it may be preferred to cause the resources to operate in conjunction with each other, in accordance with the policy. For example, the sound volume information can also be controlled by the policy that controls only in the client side by displaying just one icon with the server side always turned ON. The policy to control the resource information may be previously set or the user may customize it.

As described above, with the embodiment, it is possible to accordingly include the resource information of the client in the screen information to be displayed on the display of the client that is using the remote desktop solution, so that the user can work in an environment where as if the user were using the fat client personal computer, without being conscious of the remote desktop solution. Particularly, in the case where the same application is installed in the client and in the server, there is no need to make the display pertaining to the both resources, but with one icon or shortcut displayed, it is possible to provide a preferred operational environment where the user can efficiently work.

According to this document, in the remote desktop system, the client resource information can be reasonably included in the client screen information the server manages. This makes it possible for the user to establish a screen environment where as if the user were using a single client.

What is claimed is:

1. A remote desktop system comprising a client and a server connected via a network,
the client comprising:
a display device for displaying screen information; and
a resource information collection means for collecting information pertaining to at least one of the following resources: information about a battery to supply power to related units within the client, information about auxiliary equipment including a network interface card, and information pertaining to applications installed in a memory of the client, as resource information; and
a communication means for sending the resource information collected by the resource information collection means to the server via the network,
the server comprising:
a resource information management means for managing resource information including the resource information of the server and the resource information sent and obtained from the client; and
a screen information creation means for creating screen information to be displayed on the display device of the client,
wherein, based on the resource information management means, the screen information creation means creates client screen information as first screen information including the resource information of the server within the screen information of the client, or creates server screen information as second screen information including the resource information of the client within the screen information of the server, thereby to display the first or second screen information that is created by the screen creation means, that is received via the communication means, in the display device of the client, wherein the resource information management means has a determination section for determining whether the server and the client hold the same resource information, and when it is proved that the same resource information exists as a result of the determination by the determination section, the screen information creation means does not update the screen information pertaining to the same resource information, and wherein when the use of one of the resources is requested from the client, the system uses either the client or the server that will perform at an optimum level, and when the remote desktop system determines that the client or the server performing at the optimum level is expected to change, the remote desktop system changes the use of the resource from the client or server that was performing at the optimum level, to the client or server that the remote desktop system expects to perform at a new optimum level.

2. The remote desktop system according to claim 1, wherein, when the determination section of the resource information management means does not determine that the server and the client hold the same resource, the screen information creation means adds the resource information and updates the screen information.

3. The remote desktop system according to claim 1, wherein the screen information creation means changes the screen information by sorting the client resource information and the server resource information that the server manages by the client and the server respectively, in response to a request from the client.

4. The remote desktop system according to claim 1, wherein the client has a writing control means of permitting the reading and execution of data in the client and prohibiting the writing of data in the client, except for an access from a specific device.

5. The remote desktop system according to claim 1, wherein the screen information creation means includes an icon or a shortcut indicating the resource information as display pertaining to the resource information, in the screen information.

6. The remote desktop system according to claim 1, wherein when a battery information that the client has, is included in the resource information, the screen information creation means includes an icon or a shortcut indicating the battery, in the second screen information.

7. The remote desktop system according to claim 1, the client further comprising a target resource definition DB for storing the resource information to be managed, the server further comprising a resource management DB for storing the resource information in the server and the client that the server manages, wherein the resource information collection means refers to a target resource definition DB, collects the resource information defined in the DB, and sends the information to the server, and the server adds and stores the resource information in the resource management DB, when the received resource information is new.

8. The remote desktop system according to claim 1, wherein the server has a policy management DB for storing handling policy pertaining to the resource information and controls either of the server or the client, in accordance with a definition of the policy registered in the policy management DB.

9. A control method of screen information in a remote desktop system where a client and a server are connected via a network, comprising the steps of:

collecting information pertaining to at least one of the following resources: information about a battery to supply power to related units within the client, information about auxiliary equipment including a network interface card, and information pertaining to applications installed in a memory of the client as resource information; and sending the collected resource information to the server via the network, and managing resource information including the resource information of the server and the resource information sent and obtained from the client;

creating client screen information as first screen information including the resource information of the server within the screen information of the client, or creating server screen information as second screen information including the resource information of the client within the screen information of the server; and sending the created first or second screen information to the client to display it in a display device, and wherein the managing resource information has an operation of determining whether the server and the client hold the same resource information, and when it is proved that the same resource information exists as a result of the determination, only displaying the resource information pertaining to the same resource information in the first screen information and the second screen information, and wherein when the use of one of the resources is requested from the client, one of either the client or the server that will perform at an optimum level is used, and when it is determined that the client or the server performing at the optimum level is expected to change, switching the use of the resource from the client or server that was performing at the optimum level, to the client or server that is expected to perform at a new optimum level.

10. The control method of screen information according to claim 9, wherein, in the remote desktop system where the client has a target resource definition DB for storing the resource information to be managed, and the server has a resource management DB for storing the resource information in the server and the client that the server manages, the client refers to a target resource definition DB, collects the resource information defined in the DB, and sends the information to the server, and the server adds and stores the resource information in the resource management DB, when the received resource information is new.

11. A computer readable medium stored with a program containing instructions that are executed in a client and a server connected via a network and controls the handling of resource information in a remote desktop system including the client and the server, the instructions comprising:

code for collecting information pertaining to at least one of the following resources: information about a battery to supply power to related units within the client, information about auxiliary equipment including a network interface card, and information pertaining to applications installed in a memory of the client as resource information; and code for sending the collected resource information to the server via the network, and code for managing resource information including the resource information of the server and the resource information sent and obtained from the client;

code for creating client screen information as first screen information including the resource information of the server within the screen information of the client, or creating server screen information as second screen information including the resource information of the client within the screen information of the server; and code for sending the created first or second screen information to the client to display it in a display device, and wherein the managing resource information has an operation of determining whether the server and the client hold the same resource information, and when it is proved that the same resource information exists as a result of the determination, only displaying the resource information pertaining to the same resource information in the first screen information and the second screen information, and wherein when the use of one of the resources is requested from the client, one of either the client or the server that will perform at an optimum level is used, and when it is determined that the client or the server performing at the optimum level is expected to change, switching the use of the resource from the client or server that was performing at the optimum level, to the client or server that is expected to perform at a new optimum level.

* * * * *